US006587768B2

(12) United States Patent
Chene et al.

(10) Patent No.: US 6,587,768 B2
(45) Date of Patent: Jul. 1, 2003

(54) VEHICLE INSPECTION AND MAINTENANCE SYSTEM

(75) Inventors: George Chene, Sterling Heights, MI (US); Jack R. Worrall, Novi, MI (US); Reno V. Ramsey, Sterling Heights, MI (US); Wayne Shintaku, Auburn Hills, MI (US); Lee A. French, Sterling Heights, MI (US); Brian Jeffrey Mueller, Sarasota, FL (US); Gerald D. Lawruk, Clarkston, MI (US); Dennis A. Kramer, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/924,435

(22) Filed: Aug. 8, 2001

(65) Prior Publication Data

US 2003/0033061 A1 Feb. 13, 2003

(51) Int. Cl.[7] .............................................. G01M 17/00
(52) U.S. Cl. ........................................................ 701/33
(58) Field of Search ............................... 701/29, 33, 35

(56) References Cited

U.S. PATENT DOCUMENTS

| | | | |
|---|---|---|---|
| 4,204,255 | A | 5/1980 | Cremer |
| 4,404,641 | A | 9/1983 | Bazarnik |
| 4,441,359 | A | 4/1984 | Ezoe |
| 4,477,874 | A | 10/1984 | Ikuta et al. |
| 4,533,900 | A | 8/1985 | Muhlberger et al. |
| 4,660,140 | A | 4/1987 | Illg |
| 4,707,788 | A | 11/1987 | Tashiro et al. |
| 4,731,769 | A | 3/1988 | Schaefer et al. |
| 4,739,482 | A | 4/1988 | Wrigge |
| 4,773,011 | A | 9/1988 | VanHoose |
| 4,787,041 | A | 11/1988 | Yount |
| 4,926,331 | A | 5/1990 | Windle et al. |
| 4,939,652 | A | 7/1990 | Steiner |
| 4,975,847 | A | 12/1990 | Abe et al. |

(List continued on next page.)

FOREIGN PATENT DOCUMENTS

EP 0306117 A1 * 3/1989

OTHER PUBLICATIONS

U.S. patent application and Drawings for "Personal Data Computer For Vehicle Monitoring", Ser. No. 09/591,970; Filed Jun. 12, 2000.
U.S. patent application and Drawings for "Individualized Vehicle Settings", Ser. No. 09/767,930; Filed Jan. 22, 2001.
U.S. patent application and Drawings for "Vehicle Systems Data Storage", Ser. No. 09/767,932; Filed Jan. 23, 2001.

(List continued on next page.)

*Primary Examiner*—Michael J. Zanelli
(74) *Attorney, Agent, or Firm*—Carlson, Gaskey & Olds

(57) ABSTRACT

A method and system is provided for inspecting and maintaining a vehicle. In one embodiment, the present invention provides a method of capturing vehicle data including the steps of servicing a vehicle at a location corresponding to service data. Service data is input into a portable handheld computing device and transferred from the portable handheld computing device to a vehicle onboard computer. Vehicle warranty data is provided on the vehicle onboard computer. The service data and the vehicle warranty data are retrieved from the vehicle onboard computer. In another embodiment of the present invention, a method of inspecting a vehicle includes communicating with the vehicle systems using a portable handheld computing device to automatically inspect the vehicle systems. Prompts are displayed on the portable handheld computing device to guide a vehicle inspector to inspect additional vehicle systems. A help option is displayed on the portable handheld computing device associated with one of the additional vehicle systems. Selecting the help option displays instructions related to the vehicle system, such as how to inspect the system and how to fix the system if any problems are encountered.

18 Claims, 4 Drawing Sheets

U.S. PATENT DOCUMENTS

| | | | | | |
|---|---|---|---|---|---|
| 5,046,007 | A | | 9/1991 | McCrery et al. | |
| 5,091,856 | A | | 2/1992 | Hasegawa et al. | |
| 5,245,324 | A | * | 9/1993 | Jonker et al. | 324/121 R |
| 5,253,052 | A | | 10/1993 | Hanashiro et al. | |
| 5,365,436 | A | | 11/1994 | Schaller et al. | |
| 5,400,018 | A | | 3/1995 | Scholl et al. | |
| 5,475,399 | A | | 12/1995 | Borsuk | |
| 5,479,347 | A | | 12/1995 | Oguro et al. | |
| 5,541,840 | A | * | 7/1996 | Gurne et al. | 701/33 |
| 5,555,171 | A | | 9/1996 | Sonehara et al. | |
| 5,680,328 | A | | 10/1997 | Sorupski et al. | |
| 5,758,300 | A | * | 5/1998 | Abe | 455/456 |
| 5,778,381 | A | | 7/1998 | Sandifer | |
| 5,787,373 | A | | 7/1998 | Migues | |
| 5,797,107 | A | | 8/1998 | Berg et al. | |
| 5,801,767 | A | | 9/1998 | Wu | |
| 5,812,399 | A | | 9/1998 | Judic et al. | |
| 5,848,365 | A | | 12/1998 | Coverdill | |
| 5,859,628 | A | | 1/1999 | Ross et al. | |
| 5,916,286 | A | | 6/1999 | Seashore et al. | |
| 5,917,408 | A | * | 6/1999 | Cardillo et al. | 340/309.15 |
| 5,931,878 | A | | 8/1999 | Chapin, Jr. | |
| 5,933,125 | A | | 8/1999 | Fernie et al. | |
| 5,948,026 | A | | 9/1999 | Beemer, II. et al. | |
| 5,961,561 | A | | 10/1999 | Wakefield, II | |
| 5,964,813 | A | | 10/1999 | Ishii et al. | |
| 5,990,800 | A | | 11/1999 | Tamaki et al. | |
| 5,995,898 | A | * | 11/1999 | Tuttle | 427/255.31 |
| 6,003,808 | A | | 12/1999 | Nguyen et al. | |
| 6,006,147 | A | | 12/1999 | Hall et al. | |
| 6,006,148 | A | | 12/1999 | Strong | |
| 6,009,363 | A | | 12/1999 | Beckert et al. | |
| 6,052,631 | A | | 4/2000 | Busch et al. | |
| 6,055,468 | A | | 4/2000 | Kaman et al. | |
| 6,073,063 | A | | 6/2000 | Leong Ong et al. | |
| 6,084,567 | A | | 7/2000 | Ogawa | |
| 6,094,609 | A | * | 7/2000 | Arjomand | 455/456 |
| 6,104,971 | A | | 8/2000 | Fackler | |
| 6,182,006 | B1 | | 1/2001 | Meek | |

OTHER PUBLICATIONS

U.S. patent application and Drawings for "Vehicle Driver Data", Ser. No. 09/850,455; Filed May 7, 2001.

U.S. patent application and Drawings for "Vehicle Data Display Device", Ser. No. 09/716,718; Filed Nov. 20, 2000.

U.S. patent application and Drawings for "Automated Vehicle Shutdown Sequence", Ser. No. 09/767,999; Filed Jan. 23, 2001.

U.S. patent application and Drawings for "Smart Card System For Heavy Vehicles" Ser. No. 09/522,352; Filed Mar. 9, 2000.

* cited by examiner

VEHICLE INSPECTION AND MAINTENANCE SYSTEM

BACKGROUND OF THE INVENTION

This invention relates to a vehicle inspection and maintenance system, and more particularly, the invention relates to a vehicle inspection and maintenance system for use with a portable handheld computing device.

Vehicles are typically serviced in a wide variety of locations. In particular, commercial vehicles may be serviced in locations across the country as the vehicle carries goods between destinations. Detailed records of the service on the performed vehicle are typically kept at each of the service locations. Although "hard copies" of the service information also may be kept with the vehicle, it may be difficult to gather and quickly analyze the service data at a later date. When the vehicle encounters a problem requiring service to the vehicle, reference must be made to the past vehicle service history and warranty data relating to the particular vehicle. This information is necessary for the technician or service representative to make a decision on how best to service the vehicle, and whether the service is covered by the vehicle's warranty. If the vehicle is in a remote location when it is in need of service, having hard copies of the service history of the vehicle may make it difficult to relay that information to a technician. Furthermore, the vehicle warranty information may not be readily available or easy to locate.

Commercial vehicles are inspected on regular intervals to ensure that the vehicle is receiving the proper service to maintain the vehicle. Inspection systems have been proposed, which prompt the inspector through the inspection of the various vehicle systems. The inspection systems may be portable to facilitate inspection of exterior vehicle systems. If the inspector encounters a problem with the inspection or lacks knowledge on how to properly complete the inspection, information may not be readily available to the inspector to properly carry out the inspection. Moreover, if a problem is encountered during the inspection, at least a temporary fix of the vehicle system may be necessary to operate the vehicle until it may be fully serviced. This is particularly true if the vehicle is in a location that is distant from a service station. Therefore, what is needed is a vehicle inspection and maintenance system that may be conveniently used with a portable handheld computing device.

SUMMARY OF THE INVENTION AND ADVANTAGES

The present invention provides a method and system for inspecting and maintaining a vehicle. In one embodiment, the present invention provides a method and system of capturing vehicle data including the steps of servicing a vehicle at a location corresponding to service data. That is, service data is generating while servicing the vehicle at the location. Service data is input into a portable handheld computing device and transferred from the portable handheld computing device to a vehicle onboard computer. Vehicle warranty data is provided on the vehicle onboard computer. The service data and the vehicle warranty data are retrieved from the vehicle onboard computer. The service data and vehicle warranty data may be transmitted directly from the vehicle onboard computer or may first be transferred to the portable handheld computing device and then subsequently transferred. The data may be sent to a remote location by a wireless transmission or by a removable electrical connection between the portable handheld computing device and the remote location.

In another embodiment of the present invention, a method and system of inspecting a vehicle includes communicating with the vehicle systems using a portable handheld computing device to automatically inspect the vehicle systems. Prompts are displayed on the portable handheld computing device to guide a vehicle inspector to inspect additional vehicle systems. A help option is displayed on the portable handheld computing device associated with one of the additional vehicle systems. Selecting the help option displays instructions related to the vehicle system, such as how to inspect the system and how to fix the system if any problems are encountered. Vehicle system status may be stored on the portable handheld computing device.

Accordingly, the above invention provides a vehicle inspection and maintenance system that may be conveniently used with a portable handheld computing device.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
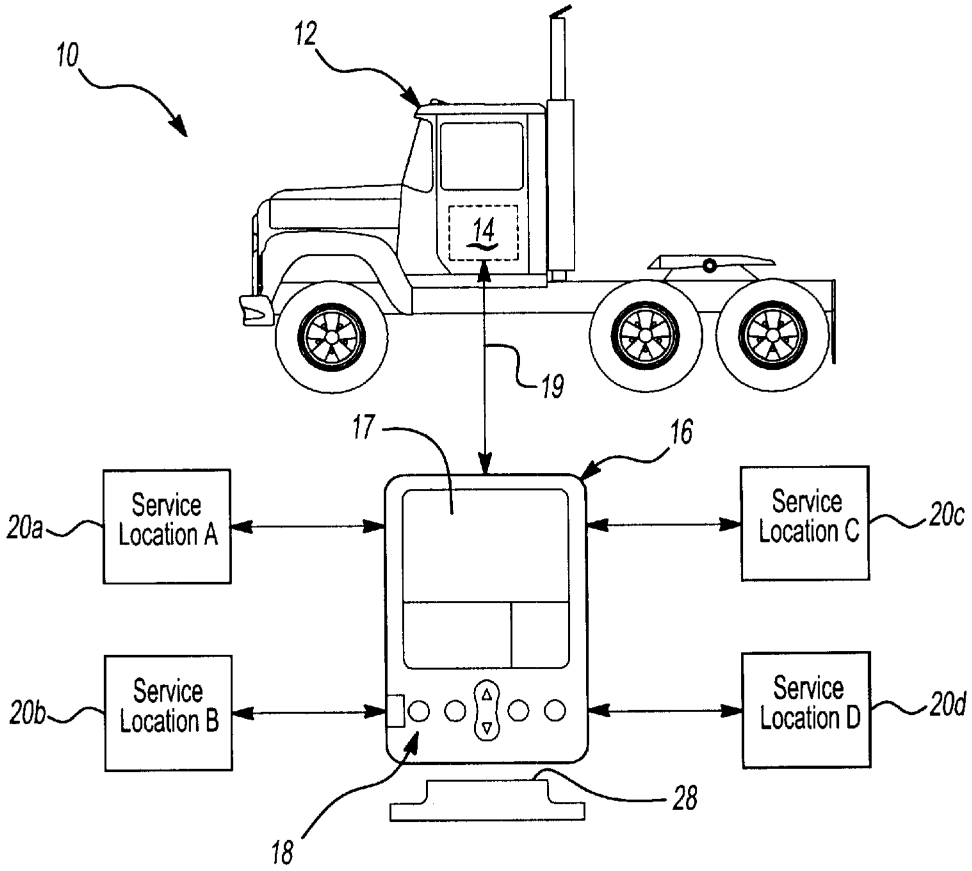
FIG. 1 is a schematic view of a vehicle data capture system.

A vehicle data capture system 10 is schematically shown in FIG. 1. The system 10 includes an onboard computer 14 located in a vehicle 12. A portable handheld computing device 16, commonly referred to as a personal digital assistant (PDA), such as a Handspring® or Palmpilot® device is removably connected to the onboard computer 12 by a data link 19, such as a J1939 data bus. The PDA 16 includes a display screen 17 that includes a character input screen portion. The display screen 17 and input screen are typically touch screens receiving inputs from the pressure of a stylus. The PDA 12 also includes input buttons 18 for receiving user inputs in addition to the inputs received from the input screen. The PDA 16 includes a dataport for transmitting data to the onboard computer 14 and other external devices. The vehicle 12 preferably includes a cradle or receptacle for receiving the PDA 16. The cradle may include a vehicle dataport 28 that is in communication with the vehicle's databus. However, it is to be understood that the PDA 16 may communicate with the vehicle in a manner other than using an electrical connection as described.

The onboard computer 14 stores the vehicle warranty information, such as the length of coverage of the powertrain by the manufacturer. During the life of the vehicle 12, the vehicle 12 will be serviced at a variety of service locations 20*a*, 20*b*, 20*c*, 20*d*. At each service location 20 service data will be generated relating to the service received by the vehicle 12. The service data is input into the portable handheld computing device 16, preferably through input device 18. The service data is transferred from the portable handheld computing device 16 to the onboard computer 14 for storage. In this manner, the onboard computer 14 stores all the service data from the various service locations 20*a*, 20*b*, 20*c*, and 20*d*, along with the warranty data. The service and warranty data is stored together in electronic form on the onboard computer 14 and stays with the vehicle 12.

Figure 2A:
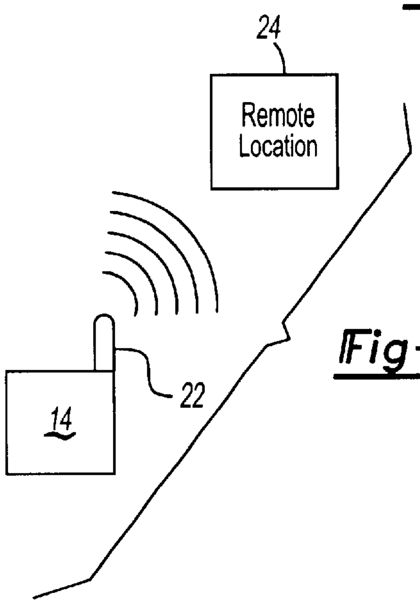
FIG. 2A is a schematic view of a first transmission device.
Figure 2B:
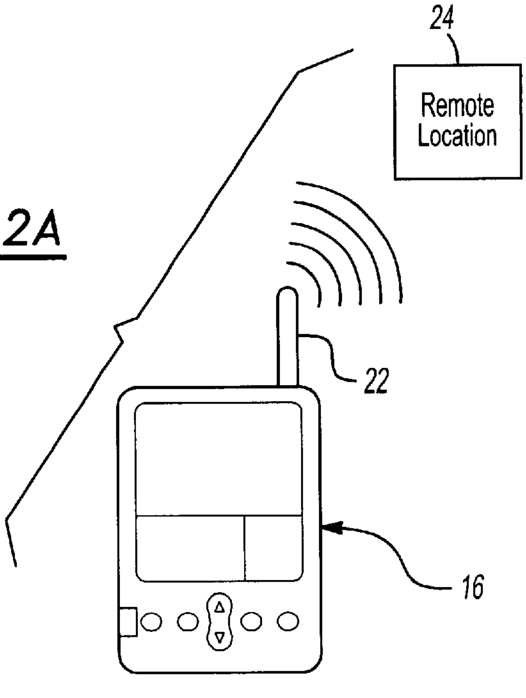
FIG. 2B is a schematic view of a second transmission device.
Figure 2C:
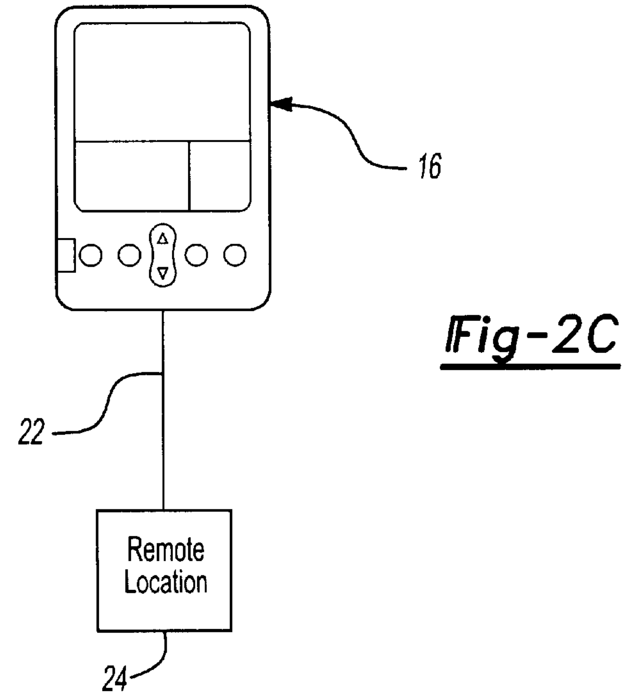
FIG. 2C is a schematic view of a third transmission device.

The service data and warranty data may need to be accessed at a later date for routine service or if a catastrophic failure of one of the vehicle systems occurs. The service data and vehicle warranty data may be retrieved at a service location, or if the vehicle is far from a service location, at a remote location 24, shown in FIGS. 2A–C. The data may be retrieved directly from the vehicle onboard computer 14. A transmission device 22 is utilized to convey the service data and vehicle warranty data to the remote location 24, which may include a service location. The data may be transmitted by a wireless transmission from the onboard computer 14 to the remote location 24, as shown in FIG. 2A. Alternatively, the data may be transferred from the vehicle onboard computer to the portable handheld computing device. The data may be transmitted by wireless transmission from the portable handheld computing device 16 to the remote location 24 (shown in FIG. 2B), or the data may be transmitted from the portable handheld computing device 16 to the remote location 24 by a removable electrical connection (shown in FIG. 2C).

Figure 3:
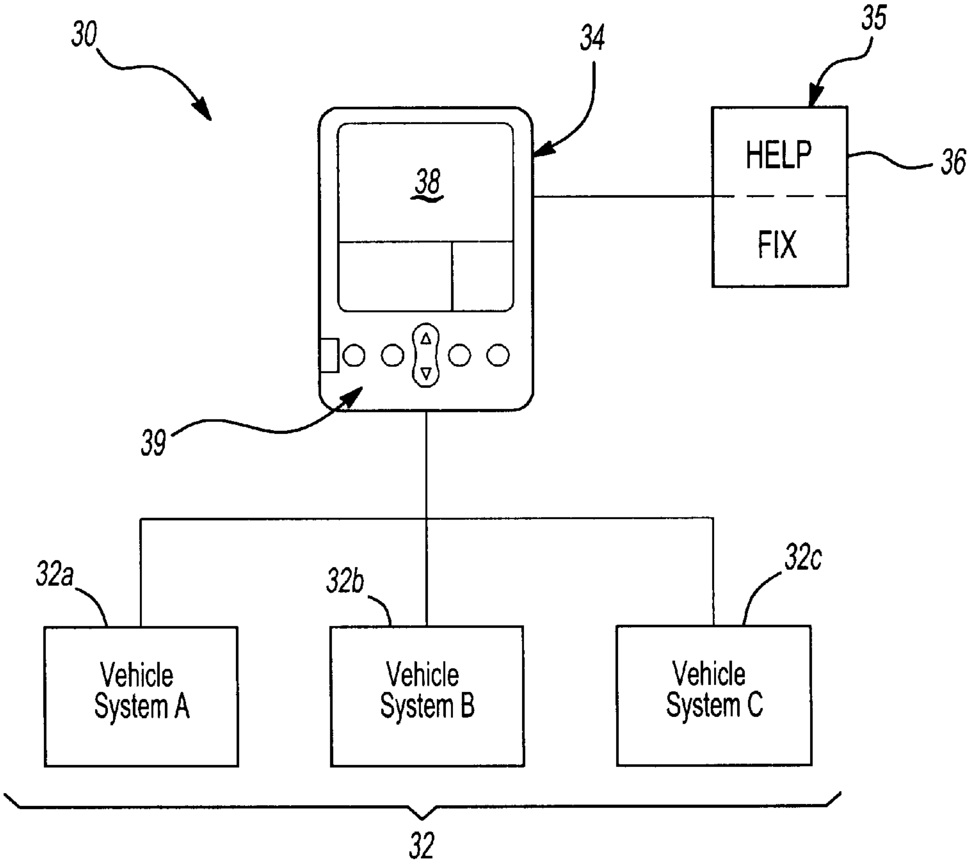
FIG. 3 is a schematic view of a vehicle inspection system.

A vehicle inspection system 30 of the present invention is shown in FIG. 3. The system 30 includes vehicle systems 32*a*, 32*b*, 32*c*, at least one of which is connected to a portable handheld computing device 34. The portable handheld computing device 34 includes a storage device 35 having help instructions 36 stored therein. The portable handheld computing device 34 includes a display device 38 for displaying a variety of screens during the inspection process and an input device 39 for inputting information relating to the inspection for subsequent storage in the storage device 35.

Figure 4:
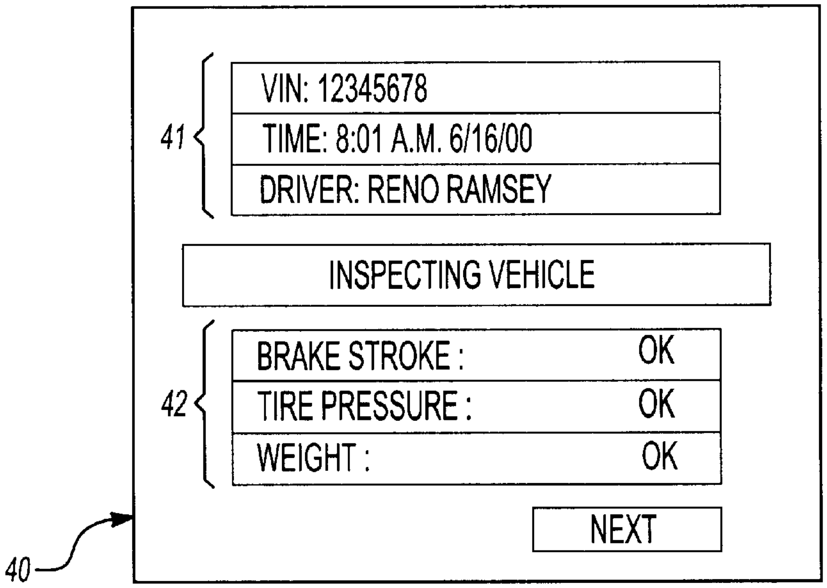
FIG. 4 is a vehicle inspection screen.
Figure 5:
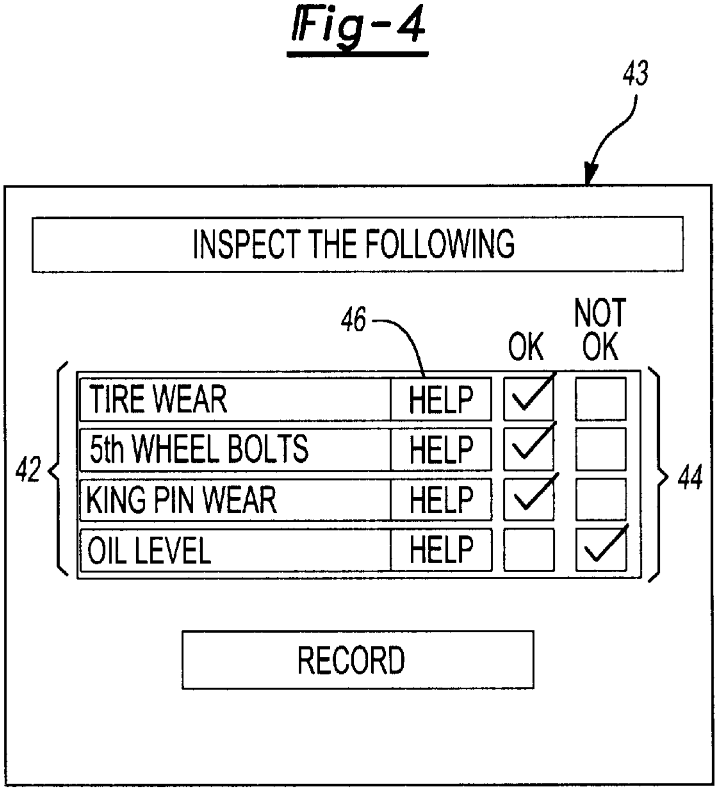
FIG. 5 is a manual inspection screen.
Figure 6:
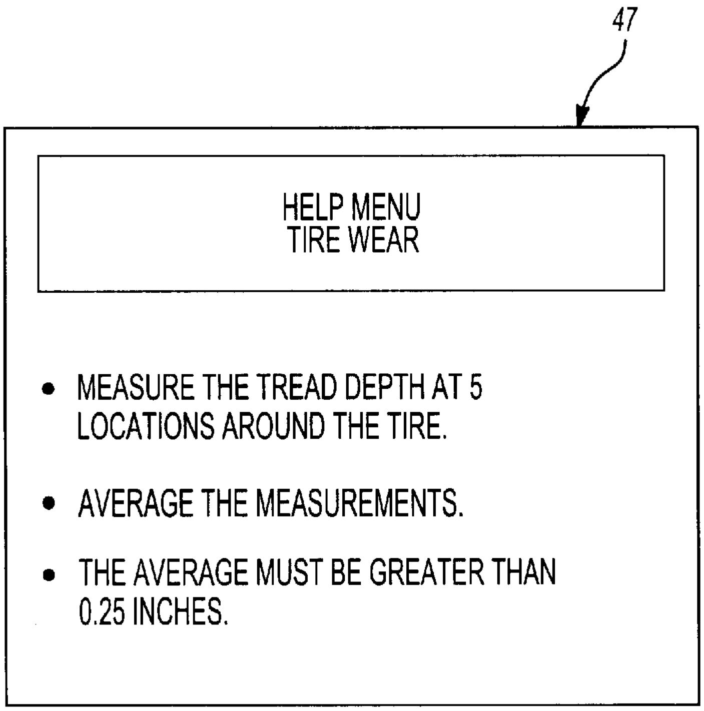
FIG. 6 is a first help screen.

An instruction screen 40 is shown in FIG. 4, and may include identification information 41 relating to a particular vehicle. The portable handheld computing device communicates with the vehicle systems, such as those indicated at 32*a* and 32*b*. The status of the parameters, indicated at 44 and 42, respectively, of the vehicle systems is stored in storage device 35. Inspection of the remaining vehicle systems 32*c* are manually inspected through the use of manual inspection screen 43, shown in FIG. 5. The various parameters 42 for the vehicle systems 32 are displayed to prompt the inspector through the inspection process. The inspector may indicate the status 44 of the parameter 42 such as "OK" or "NOT OK". If the inspector desires additional instruction a help option 46 may be selected for the parameter 42 by selecting "HELP" for that parameter. For example, tire wear must be measured in a particular manner. If the inspector is unaware of how to inspect the vehicle for tire wear, the help option 46 for tire wear may be selected. A help screen 47, shown in FIG. 6, may be displayed instructing the inspector to measure the tire tread depth at five locations around the tire and check that the average of the measurements is greater than an acceptable level.

Figure 7:
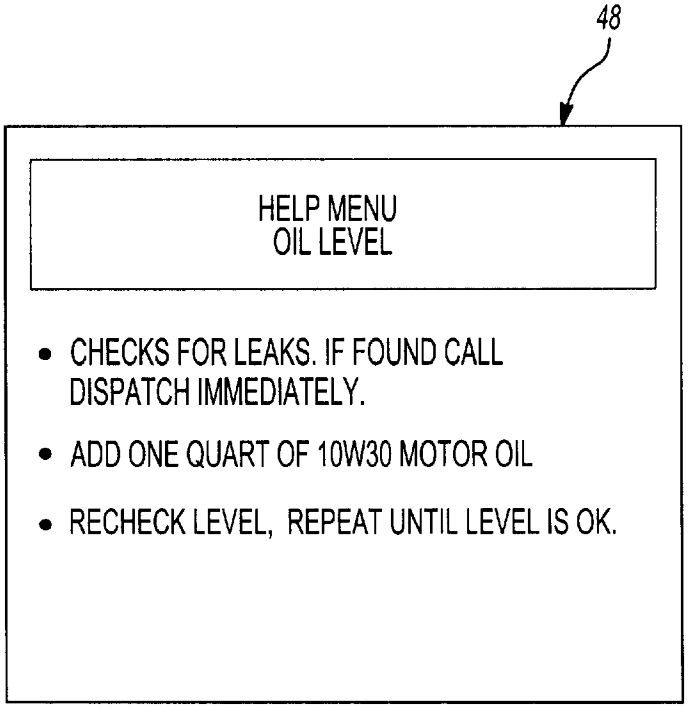
FIG. 7 is a second help screen.

The help screen may also provide information for the inspector to fix a problem encountered during the inspection of a vehicle system. For example, while inspecting the vehicles engine lubrication, an oil leak may be discovered. Referring to FIG. 7, by selecting the help option 46 for the oil level, the inspector may be prompted through a series of actions to obtain at least a temporary fix until the vehicle may be more fully serviced. In this manner, detailed information may be provided to the inspector during the inspection process to more accurately inspect the vehicle and fix any problems that may be encountered.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of capturing vehicle data comprising the steps of:

a) servicing a vehicle at a location corresponding to service data;

b) inputting the service data into a portable handheld computing device;

c) transferring the service data from the portable handheld computing device to a vehicle onboard computer;

d) providing vehicle warranty data on the vehicle onboard computer; and e) retrieving the service data and the vehicle warranty data from the vehicle onboard computer.

2. The method according to claim 1, further including the steps of:

f) servicing a vehicle at a second location corresponding to a second service data;

g) inputting the second service data into the portable handheld computing device; and h) transferring the second service data from the portable handheld computing device to the vehicle onboard computer.

3. The method according to claim 1, wherein step e) includes conducting a wireless transmission to transmit the service data and the vehicle warranty data from the onboard computer to a remote location.

4. The method according to claim 1, wherein step e) includes transferring the service data and the vehicle warranty data from the onboard computer to the portable handheld computing device and conducting a wireless transmission to transmit the service data and the vehicle warranty data from the portable handheld computing device to a remote location.

5. The method according to claim 1, wherein step e) includes transferring the service data and the vehicle warranty data from the onboard computer to the portable handheld computing device, connecting the portable handheld computing device to a remote location, and transferring the service data and the vehicle warranty data from the portable handheld computing device to the remote location.

6. A system for capturing vehicle data comprising:

a vehicle onboard computer storing vehicle warranty data;

a portable handheld computing device having an input device receiving service data corresponding to vehicle service at a location;

a data link interconnecting said vehicle onboard computer and said portable handheld computing device for transferring said service data to said vehicle onboard computer for storage; and a transmission device for transmitting said service data and said vehicle warranty data from the system to a remote location.

7. The system according to claim 6, wherein said transmission device is a wireless transmission device.

8. The system according to claim 7, wherein said wireless transmission device is connected to said portable handheld computing device with said portable handheld computing device receiving said service data and said vehicle warranty data from said vehicle onboard computer.

9. The system according to claim 7, wherein said wireless transmission device is connected to said vehicle onboard computer.

10. The system according to claim 6, wherein said transmission device is a removable electrical connection between said portable handheld computing device and said remote location with said portable handheld computing device receiving said service data and said vehicle warranty data from said vehicle onboard computer.

11. A method of inspecting a vehicle comprising the steps of:

a) communicating with vehicle systems using a portable handheld computing device to automatically inspect the vehicle systems;

b) displaying prompts on the portable handheld computing device to guide a vehicle inspector to inspect additional vehicle systems;

c) displaying a help option associated with one of the additional vehicle systems on the portable handheld computing device;

d) selecting the help option;

e) displaying instructions on the portable handheld computing device related to the one of the additional vehicle systems; and f) storing a status of the vehicle systems and the additional vehicle systems in the portable handheld computing device.

12. The method according to claim 11, wherein one of the additional vehicle systems is vehicle tires.

13. The method according to claim 11, wherein one of the additional vehicle systems is engine lubrication.

14. The method according to claim 11, further including inputting the status of the additional vehicle system into the portable handheld computing device.

15. The method according to claim 11, wherein the instructions includes information on fixing the one of the additional vehicle systems.

16. A vehicle inspection system comprising:

vehicle systems;

a portable handheld computing device in communication with said vehicle systems, said portable handheld computing device including a display device and an input device; and a storage device in said portable handheld computing device having help instructions relating to one of said vehicle systems with said help instructions displayed on said display device in response to a help option being selected with said input device, wherein said portable handheld computing device performing an automatic inspection on another of said vehicle systems.

17. A vehicle inspection system comprising:

vehicle systems;

a portable handheld computing device in communication with said vehicle systems, said portable handheld computing device including a display device and an input device; and a storage device in said portable handheld computing device having help instructions relating to one of said vehicle systems with said help instructions displayed on said display device in response to a help option being selected with said input device, wherein said one of said vehicle systems is vehicle tires.

18. A vehicle inspection system comprising:

vehicle systems;

a portable handheld computing device in communication with said vehicle systems, said portable handheld computing device including a display device and an input device; and a storage device in said portable handheld computing device having help instructions relating to one of said vehicle systems with said help instructions displayed on said display device in response to a help option being selected with said input device, wherein said one of said vehicle systems is engine lubrication.

* * * * *